Figures 1, 2, 3:
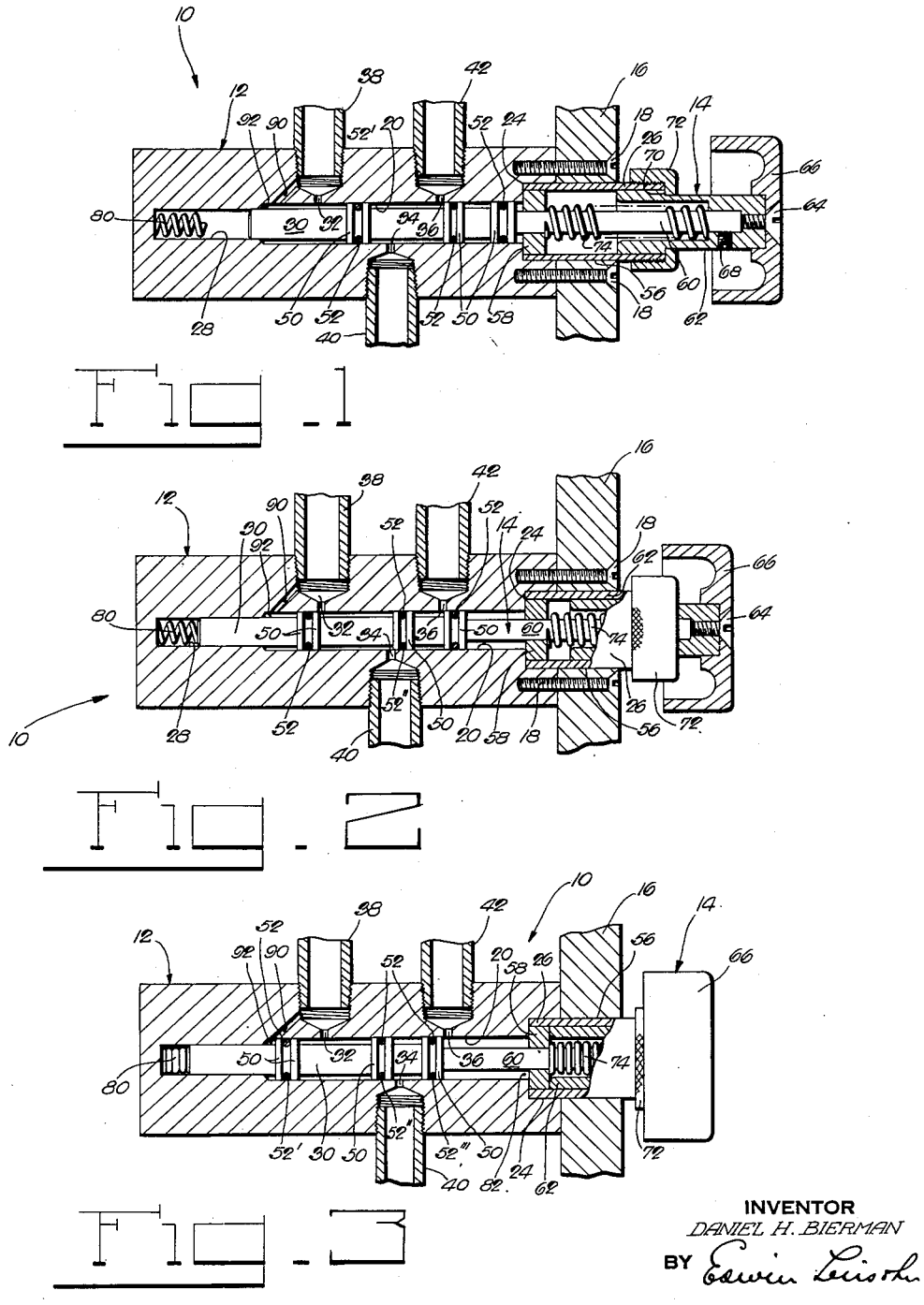

March 31, 1953  D. H. BIERMAN  2,633,324

MANUAL MULTIWAY VALVE

Filed April 27, 1948

INVENTOR
DANIEL H. BIERMAN
BY Edwin Leister
ATTORNEY

Patented Mar. 31, 1953

2,633,324

UNITED STATES PATENT OFFICE 2,633,324

MANUAL MULTIWAY VALVE

Daniel H. Bierman, Malverne, N. Y.

Application April 27, 1948, Serial No. 23,517

5 Claims. (Cl. 251—76)

This invention relates to valves, and more particularly to push valves of the multi-way type.

It is the primary object of the present invention to provide a valve of this type which may accurately and unmistakably be manipulated into its different operating positions solely by the operator's sense of touch, rather than by the less reliable mode of compelling the operator to observe visible indications of the different valve positions.

It is another important object of the present invention to provide a valve of this type which is simple and rugged in construction, easy to assemble and repair, convenient to manipulate, and safe in operation even at high operating pressures.

The above and other objects, features and advantages of the present invention will be more fully understood from the following description considered in connection with the accompanying illustrative drawings.

In the drawings:

Fig. 1 is a longitudinal section through the valve according to the present invention; and Figs. 2 and 3 are sections similar to Fig. 1, showing the valve in different operating positions.

Referring to the drawings, the reference numeral 10 designates a valve structure which, in the present instance, is a push valve of the multi-way type. The valve structure 10 comprises a valve body 12 and a sliding valve unit 14. The valve body 12, which may be made of any suitable material and assume any desired shape, is adapted for mounting on any suitable support, such as an upright control panel 16, by means of screws 18. The valve body 12 is provided with a longitudinal bore 20, one end of which is counter-bored at 24 for the reception of a sleeve 26. The other end of the bore 20 is continued in the form of a diametrically reduced extension 28 which is adapted for sliding reception of the adjacent end of a plunger-type valve 30. The bore 20 serves as a valve chamber into which lead a plurality of ducts 32, 34 and 36 that are in communication with conduits 38, 40 and 42, respectively, threaded into the valve body 12.

The valve 30 is adapted to provide communication between duct 34 and either duct 32 or 36, and also to vent duct 36. To this end, the plunger-type valve 30 is provided with several spaced, preferably integral collars 50 which are peripherally grooved to receive suitable packing rings 52, respectively.

The sleeve 26 may be pressfitted or otherwise firmly secured in the counter-bore 24 in the valve body 12, and extended through an aperture 56 in the support 16 in the manner shown in Fig. 4. Freely slidable in the sleeve 26 is a collar 58 through which the diametrically reduced shank 60 of the valve 30 is freely slidable.

Longitudinally slidable in the sleeve 26 is a shell-like member 62 to which is secured as at 64 a knob 66 by means of which the valve 30 is to be manipulated into its different operating positions. The shank 60 of the valve 30 is suitably secured to the member 62, as by a set screw 68, for instance. Member 62 is provided with an annular shoulder 70 which is normally forced into engagement with a threaded cap 72 on the sleeve 26 by a compression spring 74 which surrounds the valve shank 60 and is interposed between the collar 58 and the member 62. When the member 62 thus bears against the cap 72, the valve 30 is in its normal position in which the ducts 34 and 36 are in communication with each other, while communication between the ducts 32 and 34 is intercepted by the packing ring 52 on the valve 30. Hence, it is the function of the instant valve structure 10 to provide communication between the conduits 40 and 42 when the valve 30 is not depressed.

On depressing or inwardly pushing the valve 30 by means of the knob 66, from its normal position (Fig. 1) into the intermediate position shown in Fig. 2, the valve 30 will engage, but not compress, a compression spring 80 in the extension 28 of the valve chamber 20. In this intermediate position of the valve 30, communication is provided between the ducts 32 and 34, while communication between the ducts 34 and 36 is intercepted by the packing ring 52 on the valve 30.

On further depressing the valve 30 from the intermediate position shown in Fig. 2 into the end position shown in Fig. 3, the spring 80 is being compressed. While the operator is compelled, on depressing the valve 30 from its normal position, to exert a gradually increasing force on the knob 66 in order to compress the spring 74, such force has to be increased so suddenly and considerably in order additionally to compress the spring 80 that the operator knows unmistakably when shifting the valve from the intermediate position (Fig. 2) into the end position (Fig. 3). Thus, without any visible indication of the different valve positions, the operator nevertheless feels distinctly when reaching the intermediate and end positions of the valve. Hence, if the valve is to be shifted into its intermediate position, the operator will depress the knob 66 until encountering a sudden considerably increased resistance, as constituted by the spring 80 which resistance tells him that he need depress the valve no further since the same is then in the desired intermediate position. To overcome this added, quite considerable resistance, a force will have to be applied which the operator will unmistakably associate in his mind with the shift of the valve into its end position.

In the end position of the valve (Fig. 3), communication between the ducts 32 and 34 is intercepted by the packing ring 52″, but the packing ring 52‴ now assumes a position in which to expose the duct 36 to the adjacent end 82 of the valve chamber 22 for the purpose of venting conduit 42. To this end, the parts 58, 60, 62 and 72 are deliberately provided with sufficient clearance to permit venting thereat of the conduit 42 to the atmosphere.

The valve body 12 is also provided with a by-pass 90 between the duct 32 and the adjacent end 92 of the valve chamber 20. Thus, if the conduit 38 contains fluid under pressure, such as compressed air, the latter will tend to return the valve 30 from its end position beyond its intermediate position, i. e., into a position in which the packing ring 52′ permits communication between the by-pass 90 and the duct 32 by way of the valve chamber 20. The by-pass 90 thus serves to direct compressed air from the conduit 38 against the valve 30 in such a way as to force the valve from its end position, if the springs 74 and 80 should for any unforseen reason fail to do so.

The instant valve is so constructed that all conduits 38, 40 and 42 are sealed in the valve chamber 20 from each other by the packing rings 52, except when planned communication is provided between the different conduits in the normal and intermediate positions of the valve. The valve structure is rugged and consists of a minimum number of relatively simple parts. The valve unit 14, consisting of the sliding valve 30, collar 58, spring 74, member 62, cap 72 and knob 66, may conveniently be pre-assembled and mounted in the valve body by inserting it in the latter and threading the cap 72 over the adjacent end of the sleeve 26. The removal of the valve unit 14 from the valve body 12 (Fig. 1), for purposes of inspection, maintenance or replacement of parts, is likewise facile. The explained venting of the conduit 42 by way of the clearance between the parts 58, 60, 62 and 72 is not only an extremely simple solution of the problem of venting this duct, but may be further desirable from the standpoint of having the operator actually feel compressed air, for instance, escape from the conduit 42 when the latter is vented.

The instant valve structure 10 has numerous practical applications and while eminently suitable for use with a liquid storage tank having indicator means associated therewith it is not necessarily limited thereto.

While I have shown and described the preferred embodiments of my invention, it will be understood that various changes may be made in the present invention without departing from the underlying idea or principles of the invention within the scope of the appended claims.

Having thus described my invention, what I claim and desire to secure by Letters Patent, is:

1. A valve structure, comprising a valve body having a fluid passage of which one end serves as a venting outlet with its opposite end being closed, a plurality of fluid ducts leading into said passage at longitudinally spaced points thereof, a valve member in said passage having a handle portion extending with clearance through said outlet to the outside of said valve body, said valve member having longitudinally spaced collars in sealing engagement with said passage and being movable at said handle portion into different positions in which to provide between adjacent collars thereon communication through said passage between consecutively spaced ducts, respectively, and said valve member being also movable into another and distinct position in which said collars intercept communication between said ducts and permit communication through said passage between said venting outlet and the nearest duct thereto, and means positioned in said fluid passage at said opposite end thereof for yieldingly urging said valve member from said other position, said means being in relaxed condition when said handle portion is in said different positions.

2. A valve structure, comprising a valve body having a fluid passage of which one end serves an a venting outlet with its opposite end being closed, a plurality of fluid ducts leading into said passage at longitudinally spaced points thereof, and a valve member in said passage having a handle portion extending with clearance through said outlet to the outside of said valve body, said valve member having three longitudinally spaced collars in sealing engagement with said passage and being movable at said handle portion in one direction through three distinct positions from a first position, in which the pair of ducts closest to said handle portion are in communication through fluid passage, into a second position in which two adjacent ones of said collars provide communication through said passage between consecutive ducts nearest to said closed end, respectively, and being also movable in said one direction from said second position into a third position in which said collars intercept communication between said ducts and permit communication through said passage between said outlet and the nearest duct thereto, spring means positioned between said handle portion and the collar nearest thereto for normally urging said valve member into said first position, and resilient means positioned in said fluid passage at said opposite end thereof for yieldingly resisting movement of said valve member from said second into said third position only.

3. A valve structure, comprising a valve body having a longitudinal fluid passage with a closed end and a venting outlet at the other end, and fluid ducts leading into said passage at longitudinally spaced points thereof, and a valve member in said passage having a handle portion extending with clearance through said outlet to the outside of said valve body, said valve member having longitudinally spaced collars in sealing engagement with said passage and being movable at said handle portion longitudinally in said passage in one direction toward the closed end thereof through three distinct positions from a first position, in which the pair of ducts closest to said handle portion are in communication through said fluid passage, through a second position, in which two adjacent ones of said collars provide communication through said passage between consecutive ducts nearest to said closed end, into a third position, in which to provide communication between said venting outlet and the one duct nearest thereto, said valve body having a by-pass between said closed passage end and the duct nearest thereto, and the end collar on said valve member nearest said closed passage and moving into interposition between said closed passage end and the duct nearest thereto on movement of said valve member from said second position into said third position, said by-pass being effective to urge said valve member from said third position by fluid under pressure in said last mentioned duct.

4. A valve structure, comprising a valve body having a longitudinal fluid passage with a closed end and a venting outlet at the other end, and fluid ducts leading into said passage at longitudinally spaced points thereof, and a valve member in said passage having a handle portion extending with clearance through said outlet to the outside of said valve body, said valve member having longitudinally spaced collars in sealing engagement with said passage and being movable at said handle portion longitudinally in said passage in one direction toward the closed end thereof through three distinct positions from a first position, in which the pair of ducts closest to said handle portion are in communication through said fluid passage, through a second position, in which two adjacent ones of said collars provide communication through said passage between consecutive ducts nearest to said closed end, into a third position, in which to provide communication between said venting outlet and the one duct nearest thereto, said valve body having a by-pass between said closed passage end and the duct nearest thereto, and the end collar on said valve member nearest said closed passage end moving into interposition between said closed passage end and the duct nearest thereto on movement of said valve member from said second position into said third position, said by-pass being effective to urge said valve member from said third position by fluid under pressure in said last mentioned duct, and a compression spring positioned in said fluid passage adjacent said closed end thereof, said spring being engaged and compressed by the adjacent end of said valve member on movement of the latter from said second position into said third position only.

5. A valve structure, comprising a valve body having a longitudinal fluid passage with a closed end and a venting outlet at the other end, and fluid ducts leading into said passage at longitudinally spaced points thereof, and a valve member in said passage having a handle portion extending with clearance through said outlet to the outside of said valve body, said valve member having longitudinally spaced collars in sealing engagement with said passage and being movable at said handle portion longitudinally in said passage in one direction toward the closed end thereof through three distinct positions from a first position, in which the pair of ducts closest to said handle portion are in communication through said fluid passage, through a second position, in which two adjacent ones of said collars provide communication through said passage between consecutive ducts nearest to said closed end, into a third position, in which to provide communication between said venting outlet and the one duct nearest thereto, a compression spring positioned between said handle portion and the collar nearest thereto for normally yieldingly urging said valve member into said first position, said valve body having a by-pass between said closed passage end and the duct nearest thereto, and the end collar on said valve member nearest said closed passage end moving into interposition between said closed passage end and the duct nearest thereto on movement of said valve member from said second position into said third position, said by-pass being effective to urge said valve member from said third position by fluid under pressure in said last mentioned duct, and a compression spring positioned in said fluid passage adjacent said closed end thereof, said spring being engaged and compressed by the adjacent end of said valve member on movement of the latter from said second position into said third position only.

DANIEL H. BIERMAN.

REFERENCES CITED

The following references are of record in the file of this patent:

UNITED STATES PATENTS

| Number | Name | Date |
|---|---|---|
| 98,599 | Jones | Jan. 4, 1870 |
| 746,324 | Gillen | Dec. 8, 1903 |
| 1,475,252 | Swanjord | Nov. 27, 1923 |
| 2,009,575 | Card | July 30, 1935 |
| 2,173,619 | Ames | Sept. 19, 1939 |
| 2,374,593 | Ernst | Apr. 24, 1945 |
| 2,415,417 | Collins | Feb. 11, 1947 |